US009804924B2

(12) United States Patent
Kim et al.

(10) Patent No.: US 9,804,924 B2
(45) Date of Patent: Oct. 31, 2017

(54) METHOD AND SYSTEM FOR RECOVERING AN IMAGE ERROR USING DATA HIDING

(75) Inventors: Kyung Su Kim, Seoul (KR); Bong Ki Kim, Chungcheongbuk-do (KR); Jae Hyoung Yoo, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 1067 days.

(21) Appl. No.: 13/807,720

(22) PCT Filed: Apr. 29, 2011

(86) PCT No.: PCT/KR2011/003207
§ 371 (c)(1),
(2), (4) Date: Dec. 28, 2012

(87) PCT Pub. No.: WO2012/002641
PCT Pub. Date: Jan. 5, 2012

(65) Prior Publication Data
US 2013/0111265 A1    May 2, 2013

(30) Foreign Application Priority Data
Jun. 30, 2010 (KR) .......................... 10-2010-0062451

(51) Int. Cl.
H04N 7/12    (2006.01)
G06F 11/14   (2006.01)
(Continued)

(52) U.S. Cl.
CPC ...... *G06F 11/1412* (2013.01); *G06F 11/1402* (2013.01); *H04N 19/30* (2014.11); *H04N 19/63* (2014.11); *H04N 19/65* (2014.11)

(58) Field of Classification Search
CPC . G06F 11/1402; G06F 11/1412; H04N 19/30; H04N 19/63; H04N 19/65
(Continued)

(56) References Cited

U.S. PATENT DOCUMENTS 5,901,178 A * 5/1999 Lee ....................... G06T 1/0028
375/240
6,137,915 A * 10/2000 Chai .................... H04N 19/895
375/E7.068
(Continued)

FOREIGN PATENT DOCUMENTS

KR    10-2001-0001208 A    1/2001
KR    10-2005-0092535 A    9/2005
(Continued)

OTHER PUBLICATIONS

Kyung-Su Kim et al., "Supplementary loss concealment technique for image transmission through data hiding" Multimed Tools Appl. Mar. 17, 2009 p. 1-16.*
(Continued)

*Primary Examiner* — Jessica M Prince
(74) *Attorney, Agent, or Firm* — IP Legal Services, LLC

(57) ABSTRACT

Described embodiments provide for recovering an error, which has occurred in video contents, by using hidden data. A video content providing server generates video contents, into which information for video error recovery is inserted. The server includes: a block segmentation unit that segments an original image into at least one block having a pre-set size; a block description information (BDI) generation unit that generates block description information (BDI) for each of the at least one block, each BDI including information necessary to recover each of the segmented blocks; a BDI insertion unit that inserts each of the generated BDI into a block that is different from a block to be recovered by using the generated BDI; and a provisional video generation unit that generates provision video contents by combining at least one block, into which the BDI has been inserted.

6 Claims, 8 Drawing Sheets

(51) Int. Cl.
*H04N 19/30* (2014.01)
*H04N 19/63* (2014.01)
*H04N 19/65* (2014.01)

(58) Field of Classification Search
USPC .................................................. 375/240.27
See application file for complete search history.

(56) References Cited

U.S. PATENT DOCUMENTS

| | | | | |
|---|---|---|---|---|
| 6,557,103 | B1* | 4/2003 | Boncelet, Jr. | H04K 1/00 |
| | | | | 380/208 |
| 6,704,363 | B1 | 3/2004 | Kim | |
| 7,826,527 | B2* | 11/2010 | Wang | H04N 19/159 |
| | | | | 375/240 |
| 8,910,009 | B1* | 12/2014 | Tang | H04L 1/0041 |
| | | | | 714/752 |
| 2004/0145661 | A1* | 7/2004 | Murakami | H04N 1/32144 |
| | | | | 348/222.1 |
| 2005/0141747 | A1* | 6/2005 | Shi | G06T 1/0028 |
| | | | | 382/100 |
| 2005/0196053 | A1* | 9/2005 | Pore | H04N 19/63 |
| | | | | 382/233 |
| 2006/0056706 | A1* | 3/2006 | Marcellin | H04N 19/63 |
| | | | | 382/232 |

FOREIGN PATENT DOCUMENTS

| | | |
|---|---|---|
| KR | 10-0863925 B1 | 10/2008 |
| KR | 10-2009-0002666 A | 1/2009 |
| KR | 10-2009-0079088 A | 7/2009 |

OTHER PUBLICATIONS

Kyung-Su Kim et al., "Supplementary loss concealment technique for image transmission through data hiding", Multimed Tools Appl, Mar. 17, 2009, pp. 1-16.

Hae-Yeoun Lee et al., "Error Concealment Technique of Satellite Imagery Transmission through Information Hiding", IEICE Trans. Inf. & Syst., vol. E90-D, No. 11, Nov. 2007, pp. 1881-1884.

Korean Intellectual Property Office, International Search Report for International Application No. PCT/KR2011/003207, Jan. 2, 2012.

* cited by examiner

FIG. 8
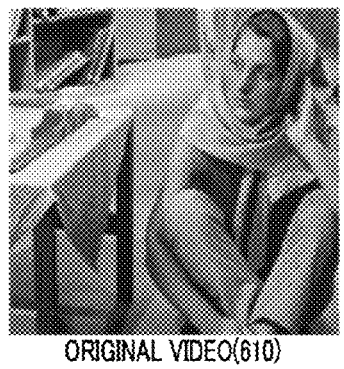
ORIGINAL VIDEO(610)
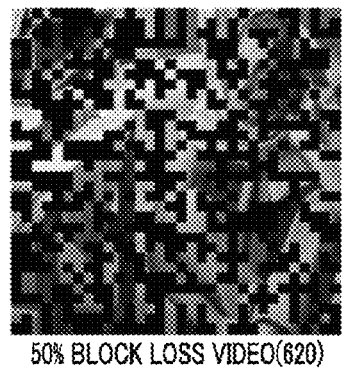
50% BLOCK LOSS VIDEO(620)
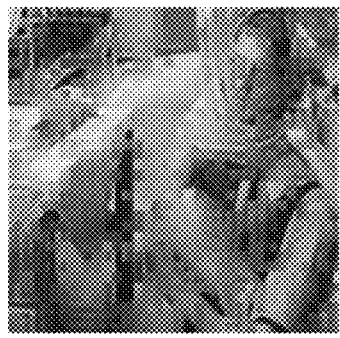
RECOVERED BY SPATIAL
INTERPOLATION SCHEME(630)
RECOVERED BY DISCRETE
COSINE SCHEME(640)
RECOVERED BY DISCRETE
WAVELET SCHEME(650)

METHOD AND SYSTEM FOR RECOVERING AN IMAGE ERROR USING DATA HIDING

CROSS REFERENCE TO RELATED APPLICATIONS

This application is a National Stage Patent Application of PCT International Patent Application No. PCT/KR2011/003207 (filed on Apr. 29, 2011) under 35 U.S.C. §371, which claims priority to Korean Patent Application No. 10-2010-0062451 (filed on Jun. 30, 2010), the teachings of which are incorporated herein in their entireties by reference.

TECHNICAL FIELD

The present disclosure relates to a method and a system for recovering an error in video contents by using hidden data, in particular, to a method and a system for recovering block loss occurred during transmission and reception of related signals through a wired or wireless network, by using hidden data.

BACKGROUND ART

With the development of the communication technology, video contents are often provided to users by transmitting video contents through a wired or wireless network or a satellite.

During the transmission of video contents, transmission errors may occur due to various causes. The error concealment (EC) technique has been introduced to detect and to correct such transmission errors. The EC technique may improve the quality of the transmitted video contents.

The error concealment (EC) technique may be classified into a forward error correction (FEC) and a backward error correction (BEC).

In the forward error correction, a reception device detects an error and recovers the detected error. When transmitting video contents, a redundant bit is added to the video contents in order to correct such transmission error.

In the backward error correction, if an error is detected in transmitted video contents, a reception device notifies the occurrence of the error in the video contents to a transmission device. In response to such notification, the transmission device retransmits the video contents and the reception device recovers the error video contents based on the retransmitted video contents. This backward error correction is used in most data communications.

In a related technology, the forward error correction or the backward error correction has been used to detect and recover an error in a video. In particular, spatial interpolation scheme has been used to detect and recover an error in a video.

In the technology using the spatial interpolation scheme, a reception device recovers pixel information of a lost block by using information of blocks positioned near the lost block and correctly received from a transmission device. Such recovered video, however, often includes blurring that can be easily acknowledged by a viewer. The quality of the recovered video is unsatisfactory.

Furthermore, a data hiding technique has been introduced to recover an error in a video (e.g., video images transported as an encoded video stream in accordance with an MPEG standard).

In the typical data hiding technique, a transmission device extracts description information from the video by using a discrete cosine transform (DCT). Such description information may be representative information of the video. The transmission device inserts the extracted description information into an original image and transmits the video with the inserted description information to a reception device. When a reception device detects an error in the received video contents, the reception device extracts the description information from the received video contents and recovers the video by correcting the detected errors based on the extracted description information.

When an error is recovered by using the typical hidden data technique, discontinuity between blocks may occur in the recovered video. Accordingly, a recovery performance of such typical hidden data technique is poor, especially, recovering images in an edge area and in a texture area.

DISCLOSURE OF THE INVENTION

Problems to be Solved

An exemplary embodiment of the present disclosure provides a method and a system for providing video contents. The provided method and system may generate block description information (BDI) including recovery information by applying discrete wavelet transform (DWT) to at least one block constituting an original image and insert the generated block description information into video contents to be provided to a user device. When an error occurs in the video contents during a transmission process, the error may be recovered by using the block description information inserted into the video contents.

Means for Solving the Problems

In order to solve the above-mentioned problems, in accordance with a first aspect of the present disclosure, there is provided a video content providing server that generates video contents, into which information for video error recovery is inserted. The server includes: a block segmentation unit may be configured to segment an original image into at least one block having a pre-set size; a block description information (BDI) generation unit may be configured to generates block description information (BDI) for each block, each BDI including information for recovery of the corresponding block; a block description information (BDI) insertion unit configured to insert each of the generated block description information (BDI) into a block different from a block for recovery with the corresponding generated block description information (BDI), and a video generation unit may be configured to generate video contents by combining at least one block into which the block description information (BDI) has been inserted. The block description information (BDI) generation unit may be configured to calculate the BDI of a corresponding block by applying discrete wavelet transform (DWT) to each of the segmented blocks, and an error, which has occurred in the video contents, is corrected by using the corresponding block description information (BDI) of the block in error.

In the first aspect, the block description information generation unit may be configured to acquire at least one sub-band including data by applying discrete wavelet transform (DWT) to each of the at least one block, and generate the corresponding block description information (BDI) matched to each of the at least one block with the data included in the acquired sub-band.

In the first aspect, the block description information generation unit may be configured to generate the block description information (BDI) by using data of a LL subband among the at least one sub-band, the LL sub-band including data of a low frequency with respect to a horizontal direction and a vertical direction.

In the first aspect, the block description information insertion unit may be configured to insert the block description information into a pre-set bit plane of the different block.

In the first aspect, the pre-set bit plane is the least significant bit (LSB) plane.

In the first aspect, the block description information insertion unit may be configured to select the different block, into which the generated block description information (BDI) is inserted, based on a distance between blocks in the original image.

In accordance with a second aspect of the present disclosure, there is provided an error recovery server for video error recovery. The server includes a block segmentation unit, an error detection unit, a block description information acquisition unit, a block recovery unit, and a video recovery unit. The error recovery server may be configured to segment first video contents into at least one block. The error detection unit may be configured to detect whether an error has occurred in the at least one block of the segmented first video contents. The block description information acquisition unit may be configured to acquire block description information (BDI) about the error block, in which the error has been detected by the error detection unit, from a different block from the error block in which the error has been detected. The block recovery unit may be configured to generate recovery data including at least one sub-band based on the acquired corresponding block description information (BDI) and to generate a recovery block corresponding to the error block, in which the error has been detected, by applying inverse discrete wavelet transform (IDWT) to the recovery data. The video recovery unit may be configured to generate second video contents with i) at least one block in which no error has been detected, and ii) at least one recovery block generated by the block recovery unit.

In the second aspect, the block recovery unit may be configured to generate the recovery data by using data included in the acquired block description information (BDI) as a LL sub-band including data of a low frequency with respect to horizontal and vertical directions, and to generate the recovery block by applying the inverse discrete wavelet transform (IDWT) to the generated recovery data.

In the second aspect, the block segmentation unit may be configured to segment the first video contents into at least one block having the same size as a size of the blocks segmented by a video content providing server from the original video to insert the block description information (BDI) into the first video contents.

In the second aspect, the error detection unit may detect occurrence of an error based on brightness of at least one pixel included in the corresponding segmented blocks.

In the second aspect, the block description information acquisition unit may be configured to select, as the different block, a block a pre-set distance away from the block in which the error has been detected.

In the second aspect, the block description information acquisition unit may be configured to acquire the corresponding block description information (BDI) from a pre-set bit plane of the selected block.

In the second aspect, the pre-set bit plane may be the least significant bit (LSB) plane.

In accordance with a third aspect of the present disclosure, there is provided a method for generating video contents including information for video error recovery. The method may include: (a) segmenting an original image into at least one block, each block having the same size; (b) transforming data included in each of the blocks into data having at least one sub-band by applying a discrete wavelet transform (DWT) to each of the blocks of the segmented original image; (c) generating block description information (BDI) including information to recover each of the blocks by using data of the sub-band; (d) inserting the generated block description information (BDI) into a pre-set bit plane of a block different from a block to be recovered by using the corresponding generated block description information (BDI); (e) generating video contents by combining at least one block into which the block description information (BDI) has been inserted; and (f) transmitting the generated provisional video contents. If an error occurs in the video contents during transmission of the video contents to a user device, the error may be correctable based on the block description information (BDI).

In the third aspect, the step (b) includes: (b1) acquiring data of a LL sub-band including data of a low frequency with respect to horizontal and vertical directions by applying the discrete wavelet transform (DWT), and the step (c) includes (c1) generating the block description information (BDI) with the acquired data of the LL sub-band.

In the third aspect, the step (d) includes (d1) selecting, as the different block, a block a pre-set distance away from a block to be recovered, into which the corresponding block description information (BDI) is inserted.

In the third aspect, the pre-set bit plane is the least significant bit (LSB) plane.

In accordance with a fourth aspect of the present disclosure, there is provided a method for recovering video contents by using information for video error recovery. The method includes: (a) segmenting first video contents into at least one block; (b) detecting an error from the segmented at least one block; (c) acquiring corresponding block description information (BDI) about the block in which the error has been detected, from a pre-set bit plane of a different block from the block in which the error has been detected, if the error is detected in at least one block among the segmented blocks; (d) generating recovery data including data of at least one sub-band by using the acquired block description information (BDI), and generating a recovery block by applying an inverse discrete wavelet transform (IDWTR) to the recovery data; and (e) generating second video contents by using a block in which no error has been detected among the segmented blocks, and the generated recovery block.

In the fourth aspect, the step (d) includes: (d1) generating the recovery data by using data included in the acquired block description information (BDI) corresponding to a LL sub-band including data of a low frequency with respect to horizontal and vertical directions, and applying a pre-set value to a sub-band except for the LL sub-band; and (d2) generating the recovery block by applying an inverse discrete wavelet transform (IDWT) to the generated recovery data.

In the fourth aspect, the different block is a pre-set distance away from a position of the block in which the error has been detected in the first video contents.

In the fourth aspect, the pre-set bit plane is the least significant bit (LSB) plane.

In accordance with a fifth aspect of the present disclosure, there is provided a video content providing system for recovery from a vide error by using video recovery information inserted into video contents. The system includes: a video content providing server, at least one error recovery server, and a user device. The video content providing server may be configured to generate at least one block description information (BDI) for error recovery by applying a discrete wavelet transform (DWT) to at least one block segmented from an original image, and to generate video contents including the at least one block description information (BDI). At least one error recovery server may be configured to detect an error occurring in the video contents during transmission of the provision video contents and to recover the detected error by applying an inverse discrete wavelet transform (IDWT) to the block description information included in the video contents. The user device may be configured to receive the video contents, in which the error has been recovered by the error recovery server and to output the provisional video contents to a display device.

In the fifth aspect, the system further includes a quality management server. The quality management server may be configured to manage quality information of a network between the video content providing server and the user device by using error detection information received from the error recovery server.

In the fifth aspect, the quality management server may be configured to manage quality of a video content providing service to the user device by using the error detection information and the error recovery information received from the error recovery server.

Technical Effects

In accordance with the foregoing means to solve the technical problems, block description information (BDI) is generated by applying discrete wavelet transform (DWT) on at least one block constituting an original image, and the generated block description information (BDI) is inserted into the other block different from the block where the BDI is extracted from. Even if an error occurs in at least one block during a transmission process, the video contents having error block can be recovered by using the block description information inserted into the other block that is different from the error block.

In accordance with the foregoing means to solve the technical problems, video contents recovered by an error recovery device are transmitted by using the same band width that a video contents providing server uses for transmitting video contents. An additional bandwidth may be not required for transmission of the recovered video contents by the error recovery device. Since the error is recovered by the error recovery device during a network transmission process, the video content providing server may be not required to retransmit the error-containing video contents ("error video contents").

In accordance with the foregoing means to solve the technical problems, each channel may be monitored for determining whether a transmission error has been detected and recovered in a communication network for a multimedia content service. Accordingly, the quality of the multimedia content service can be more effectively managed.

In accordance with the foregoing means to solve the technical problems, embodiments allow for relatively easy recovery of a transmission error occurring, for example, while transmitting a high quality medical video in a digitalized medical field, while transmitting a general satellite video or while transmitting a video through a wired or wireless network environment for providing a general video service.

BRIEF DESCRIPTION OF THE DRAWINGS

FIG. 8 illustrates an image recovered by a video error recovery system using hidden data in accordance with an exemplary embodiment of the present disclosure.

MODE FOR CARRYING OUT THE INVENTION

Figure 1:
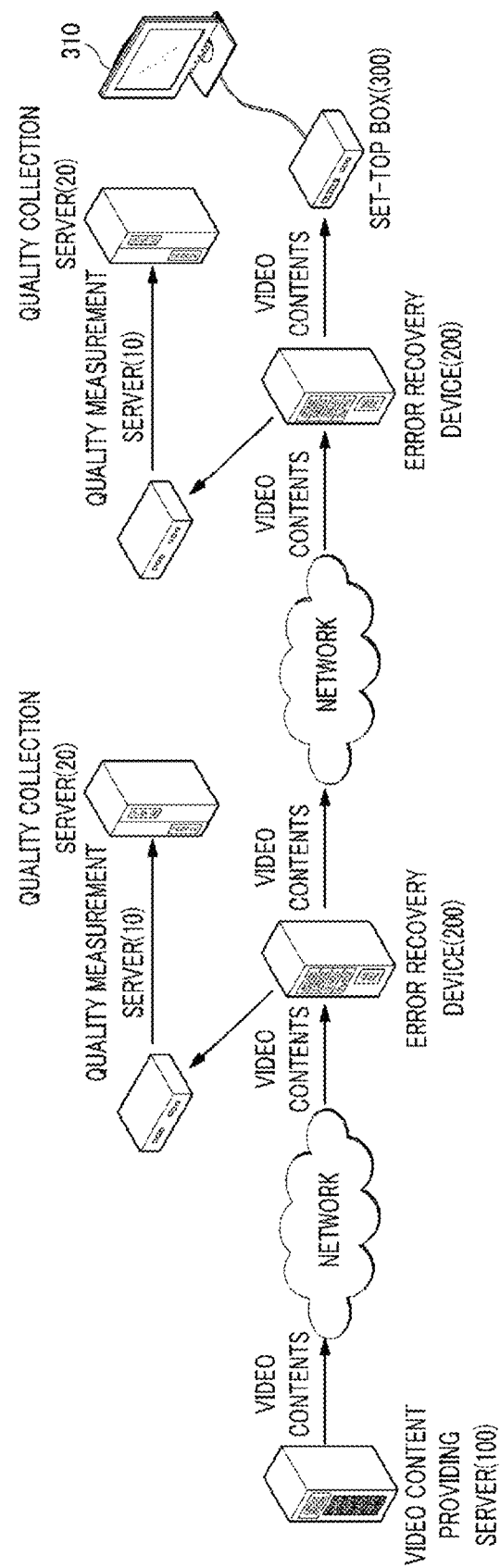
FIG. 1 illustrates a video content transmission system including a video error recovery system using hidden data in accordance with an exemplary embodiment of the present disclosure.

Hereinafter, exemplary embodiments will be described in detail with reference to the accompanying drawings so that the inventive concepts may be readily implemented by those skilled in the art. However, the present disclosure is not limited to the illustrative embodiments but can be realized in various other ways. In the drawings, certain parts or elements not directly relevant to the description are omitted to enhance the clarity of the drawings, and like reference numerals denote like parts throughout the whole document.

Throughout the whole document herein, the terms "connected to" or "coupled to" are used to designate a connection or coupling of one element to another element and include both a case where an element is "directly connected or coupled to" another element and a case where an element is "electronically connected or coupled to" another element via still another element. Further, the term "comprises or includes" and/or "comprising or including" used in the document means that one or more other components, steps, operations, and/or the existence or addition of elements are not excluded in addition to the described components, steps, operations and/or elements.

FIG. 1 illustrates a video content transmission system including an error recovery device using hidden data in accordance with an exemplary embodiment of the present disclosure.

In an exemplary embodiment of the present disclosure, a video content providing server 100 generates video contents to be provided to a set-top box 300. The video content providing server 100 generates video content information including block description information (BDI) for recovery by using original video contents. The video content providing server 100 transmits the generated video content information to the set-top box (STB) 300 through a wired or wireless network.

At least one error recovery device 200 may be positioned between the video content providing server 100 and the set-top box 300. Such error recovery device 200 detects an error that might occur in the video contents during a process for transmission of the video contents from the video content providing server 100 to the set-top box 300 and recovers the detected error.

The error recovery device 200 may be in cooperation with a quality measurement server 10 and a quality collection server 20. The quality measurement server 10 and the quality collection server 20 may be provided in a network for a video_contents providing service from the video content providing server 100 to a user device such as the set-top box 300. For example, such a video_contents providing service may be an Internet protocol television (IPTV) service.

The quality measurement server 10 and the quality collection server 20 in cooperation with the error recovery device 200 monitor each channel for determining whether a transmission error occurs in video contents to be provided to the user device through the error recovery device 200. When errors are detected, the quality measurement server 10 and the quality collection server 20 recover video contents having the detected errors through the error recovery device 200 in order to provide the recovered video contents to the user. Accordingly, deterioration of the quality of the video contents caused by a transmission error may be prevented. Furthermore, better quality video content may be provided to a user device such as the set-top box 300.

The quality measurement server 10 and the quality collection server 20 can manage quality information of a network between the video content providing server 100 and the set-top box 300 by using error information detected from the video contents transmitted through the network between the video content providing server 100 and the set-top box 300.

FIG. 1 illustrates that the error recovery device 200, the quality measurement server 10, and the quality collection server 20 are independently provided. However, the present disclosure is not limited to such a configuration. The error recovery device 200 may be included in the quality measurement server 10 or the quality collection server 20 to detect and recover an error and perform the quality management.

The set-top box (STB) 300 processes video contents received from the video content providing server 100 through a wired or wireless network and outputs the video contents through a display device 310 connected to the set-top box (STB) 300.

Although a certain image of the video contents has been lost due to an error occurring during the transmission process, the set-top box (STB) 300 may receive the video contents recovered by at least one error recovery device 200. Accordingly, the display device 310 coupled to the STB 300 may display video contents that have been recovered from the signal with transmission errors.

Figure 2:
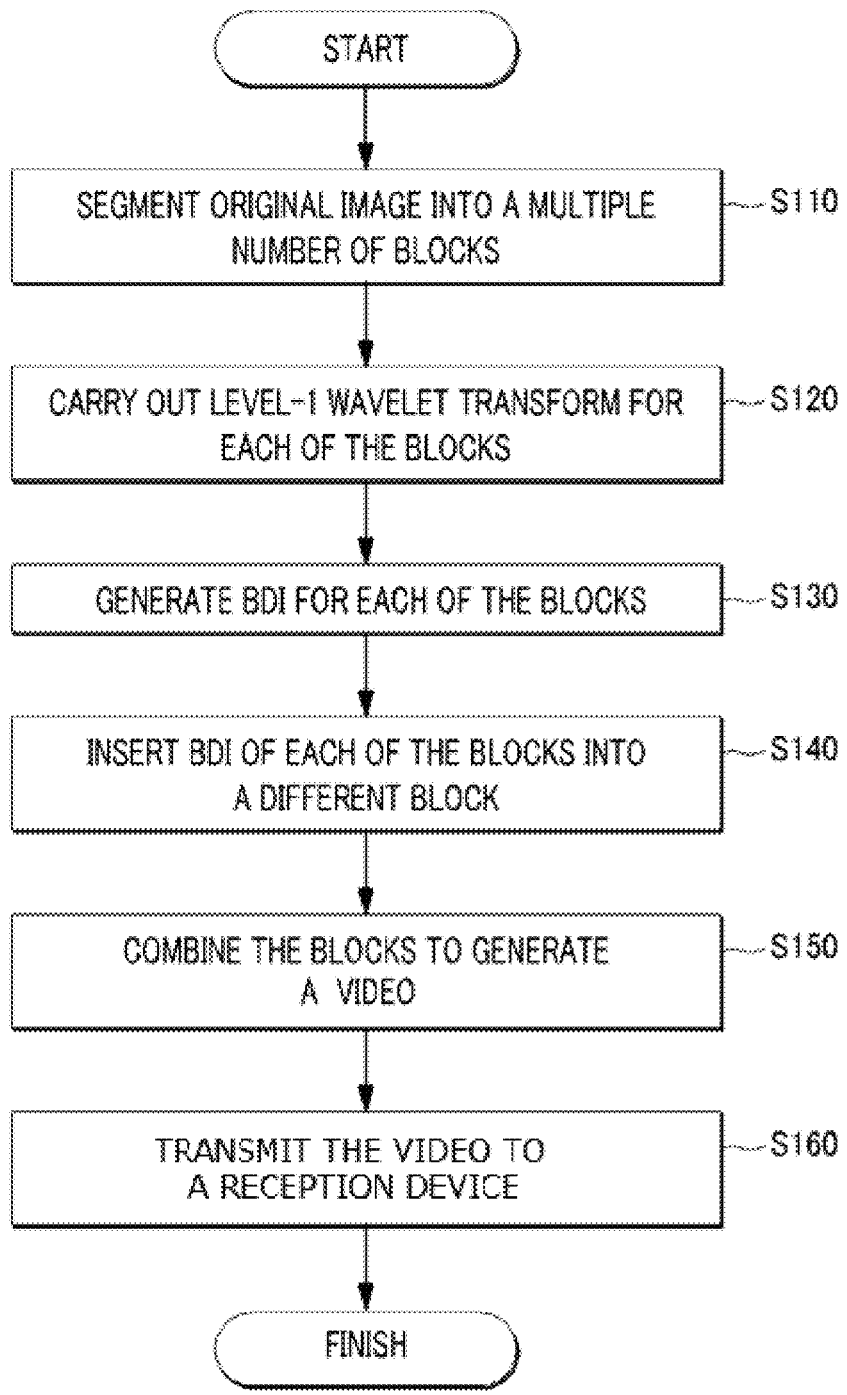
FIG. 2 illustrating a method of a video content providing server for generating video contents including error recovery data by using hidden data in accordance with an exemplary embodiment of the present disclosure.

FIG. 2 illustrates a method of a video content providing server for generating video contents including error recovery data by using a data hiding technique in accordance with an exemplary embodiment of the present disclosure.

In S110, the video content providing server 100 segments an original image into at least one block. The video content providing server 100 can segment the original image into at least one block in the same size. For example, the video content providing server 100 can segment the original image into at least one block each having a total of 64 pixels including 8 pixels in width and 8 pixels in length. However, the size of the segmented blocks is not limited to the size described above and may be larger or smaller than the size described above as cases demand.

In S120, the video content providing server 100 carries out discrete wavelet transform (DWT) on each block segmented in S110. For example, through the DWT, the video content providing server 100 may transform data in a spatial domain (included in each block) to data in a frequency domain, which has four sub-bands.

Hereinafter, the level-1 discrete wavelet transform in accordance with an exemplary embodiment of the present disclosure will be described with reference to FIG. 6.

Figure 6:
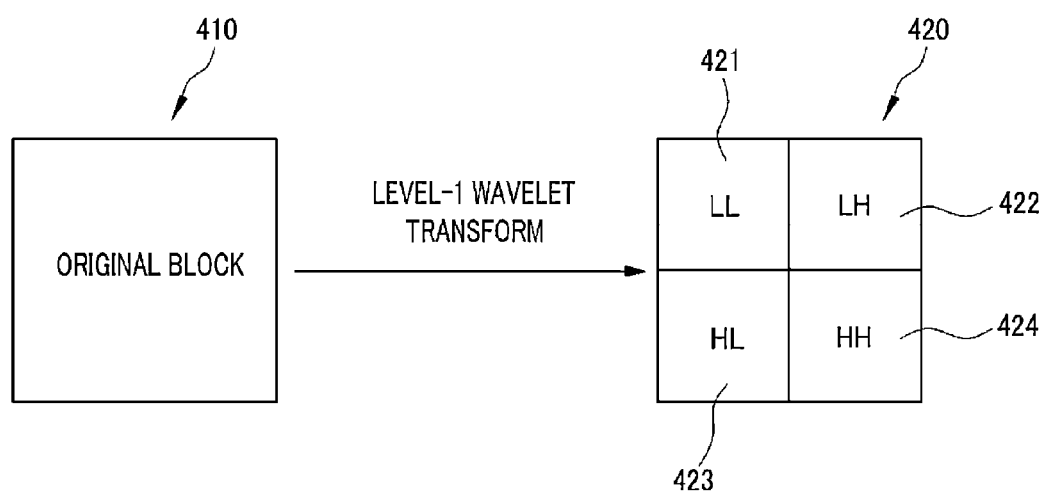
FIG. 6 illustrates an example for level-1 wavelet transform in accordance with an exemplary embodiment of the present disclosure.

FIG. 6 illustrates an example for the level-1 discrete wavelet transform in accordance with an exemplary embodiment of the present disclosure.

Referring to FIG. 6, an original block 410 generated from segmentation of an original image can be transformed into data 420 having a total of four (4) sub-bands in a frequency domain through the level-1 discrete wavelet transform.

The data 420 transformed by the level-1 discrete wavelet transform can be divided into four (4) sub-bands, i.e., LL 421, LH 422, HL 423, and HH 424. The LL sub-band 421 includes data of low frequency in vertical and horizontal directions, which are acquired by applying, to the original image, a low pass filter in horizontal and vertical directions. The LH sub-band 422 includes data of low frequency in a vertical direction and data of high frequency in a horizontal direction, which are acquired by applying a low pass filter in a vertical direction and a high pass filter in a horizontal direction.

The HL sub-band 423 includes data of high frequency in a vertical direction and data of low frequency in a horizontal direction, which are acquired by applying a high pass filter in a vertical direction and a low pass filter in a horizontal direction. The HH sub-band 424 includes data of high frequency in vertical and horizontal directions, which are acquired by applying a high pass filter in horizontal and vertical directions.

The above-described embodiment explains that the discrete wavelet transform is carried out at level-1. However, the embodiment is merely exemplary. The discrete wavelet transform can be carried out irrespective of its level.

In S130, the video content providing server 100 generates block description information (BDI) for each of the blocks by using the data obtained through the discrete wavelet transform in S120.

The video content providing server 100 can generate the block description information (BDI) by binarizing the data included in the LL sub-band having low frequency data in the vertical and horizontal directions among the data transformed from the original image through the level-1 discrete wavelet transform.

Since the LL sub-band, which is a low frequency band, includes data describing characteristics of the entire image, the video content providing server 100 can generate the block description information by using the data included in the LL sub-band.

For example, if the first four (4) pixel numerals of the LL sub-band are 12, 20, 80, and 156, block description information (BDI) of the corresponding block may be 1100, 10100, 1010000, and 10011011.

Alternatively, the video content providing server 100 may generate composite block description information (BDI) by binarizing the data included in all the LH, HL, and HH sub-bands, as well as the data included in the LL sub-band.

In S140, the video content providing server 100 inserts the block description information (BDI) generated in S130 into a pre-set block which is different from the block where the block description information (BDI) is extracted from. That is, in order to recover an error block, the video content providing server 100 inserts the block description information (BDI) of one block into the other (and different) block.

Such pre-set block to be inserted with the BDI may be determined in order to detect and recover an error from at least one of an isolated block loss, a continuous block loss, and a burst block loss. In particular, the BDI may be inserted to a block separated in a predefined distance from the block where the BDI is extracted from. The distance between the blocks means a distance between positions of blocks constituting an image.

For example, blocks of an original image are divided into two (2) groups based on positions on an original image. The block description information (BDI) generated in S130 may be inserted into a block belonging to a group excluding the block where the block description information (BDI) is extracted from.

That is, when an original image has 256 pixels in width and 256 pixels in length, the video content providing server 100 segments the original image into blocks each having 8 ×8 pixels. In this case, the original image can be segmented into a total of 1,024 blocks.

When the original image is segmented into a total of 1,024 blocks, block description information (BDI) of the first block can be inserted into the 513$^{th}$ block. Block description information (BDI) of the 513$^{th}$ block can be inserted into the first block. Block description information (BDI) of the 256$^{th}$ block and the 768$^{th}$ block can be inserted into the 768$^{th}$ and 256$^{th}$ blocks, respectively.

The video content providing server 100 may insert the generated block description information (BDI) into the least significant bit (LSB) plane of a different pre-set block.

The least significant bit (LSB) plane can be acquired by Formula 1 below.

$$A = a_{k-1}2^{k-1} + a_{k-2}2^{k-2} + \ldots + a_1 2^1 + a_0 2^0 \quad \text{[Formula 1]}$$

In the Formula 1, "A" refers to a brightness value of one pixel, "k" refers to the number of bits per pixel, and "$a_k$" is a scaling factor having a value of "0" or "1", for example. Accordingly, the least significant bit (LSB) plane of a certain block can be acquired by calculating $a_0$ of all pixels included in the certain block.

In S150, the video content providing server 100 generates a video having at least one block with the BDI inserted. For example, the video content providing server 100 combines blocks including at least one block having the BDI for generating a video to be provided to a user device.

In S160, the video content providing server 100 transmits the generated video to a reception device, e.g., a set-top box (STB) through a wired or wireless network.

Figure 3:
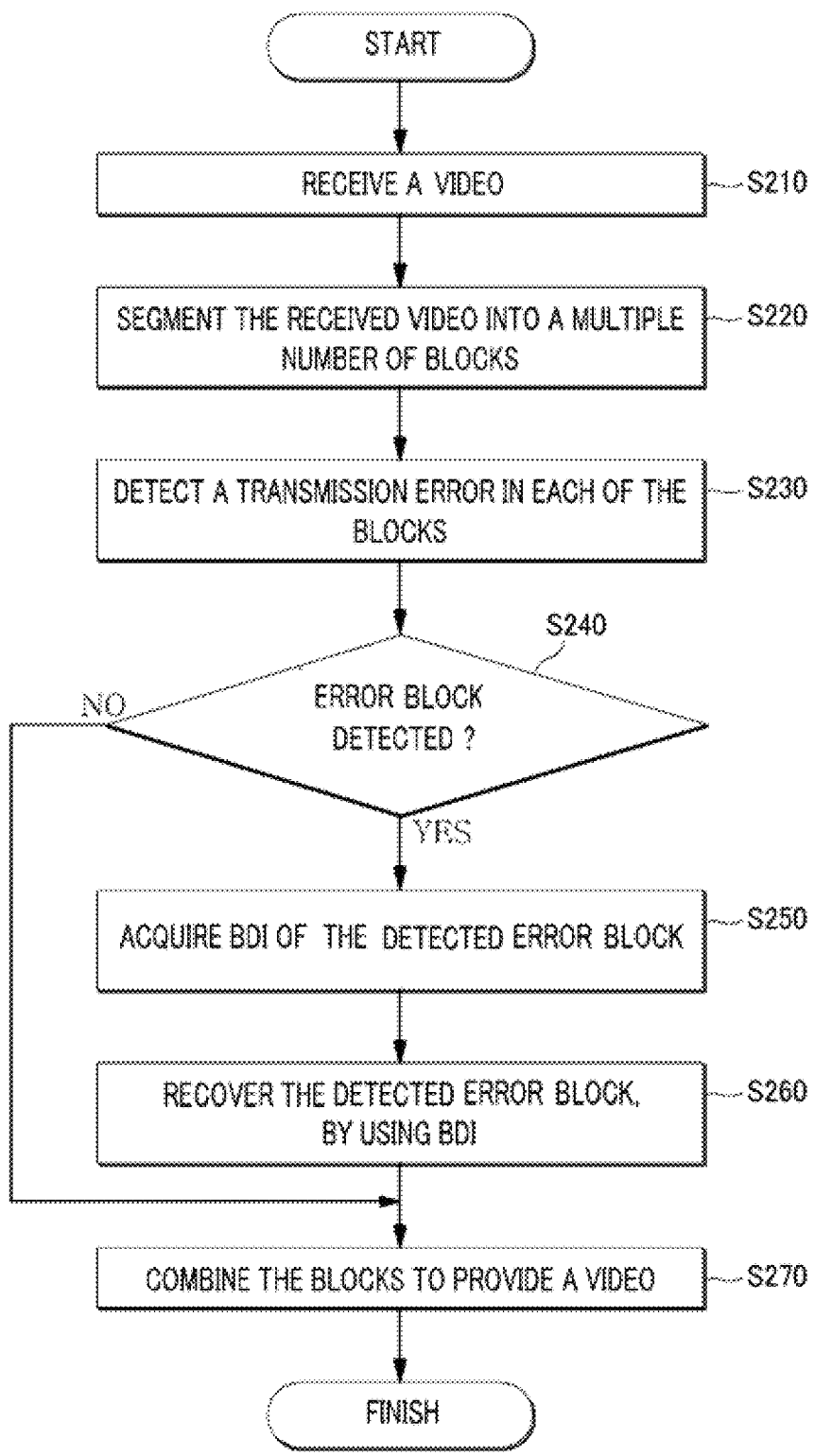
FIG. 3 illustrating a method of an error recovery device for recovering an error of video contents by using error recovery data included in the video contents in accordance with an exemplary embodiment of the present disclosure.

FIG. 3 illustrates a method of an error recovery device for recovering an error of video contents by using error recovery data included in the video contents in accordance with an exemplary embodiment of the present disclosure.

In S210, the error recovery device 200 receives a video having error recovery data (i.e., BDI) from the video content providing server 100 through a wired or wireless network. The error recovery device 200 may receive the video directly from the video content providing server 100 or receive the video from another error recovery device after recovering errors.

In S220, the error recovery device 200 segments the received video into at least one block. For example, the error recovery device 200 may segment the received video into blocks having a certain number of pixels. The error recovery device 200 may segment the received video into blocks in the same size as that of the blocks segmented by the video content providing server 100 from the original image for insertion of recovery information.

In S230, the error recovery device 200 analyzes each of the blocks to determine whether an error has occurred. In an exemplary embodiment of the present disclosure, the error recovery device 200 may determine whether an error has occurred by using an average scheme.

For example, the error recovery device 200 calculates an average of brightness values for all pixels in one block, e.g., a total of 64 pixels. If the average of the brightness values corresponds to a pre-set value, e.g., 0, the error recovery device 200 may determine that an error has occurred in the corresponding block.

In S240, based on the results of the determination in S230, the error recovery device 200 determines whether error blocks are included in the received video. In some cases, an error may be detected in at least one block. The error recovery device 200 determines whether an error has been detected and analyzes information of the detected error block.

If the test of S240 is "YES", in S250, the error recovery device 200 acquires information of the error block detected in S240. The error recovery device 200 acquires block description information (BDI) of the detected error block.

The error recovery device 200 can search for a block including the block description information (BDI) of the detected error block by using pre-set reference information and acquire block description information (BDI) for error recovery from the least significant bit (LSB) plane of the searched block.

In S260, the error recovery device 200 recovers the detected error block by using the block description information (BDI) acquired from the searched block in S250.

In order to generate the recovery data, the error recovery device 200 decimalizes binary data included in the acquired block description information (BDI), applies the decimalized data as data of LL sub-band, and applies a value of "0" as the data of the LH sub-band, the HL sub-band, and the HH sub-band.

The error recovery device 200 carries out level-1 inverse discrete wavelet transform on the generated recovery data.

Hereinafter, the level-1 inverse discrete wavelet transform in accordance with an exemplary embodiment of the present disclosure will be described with reference to FIG. 7.

Figure 7:
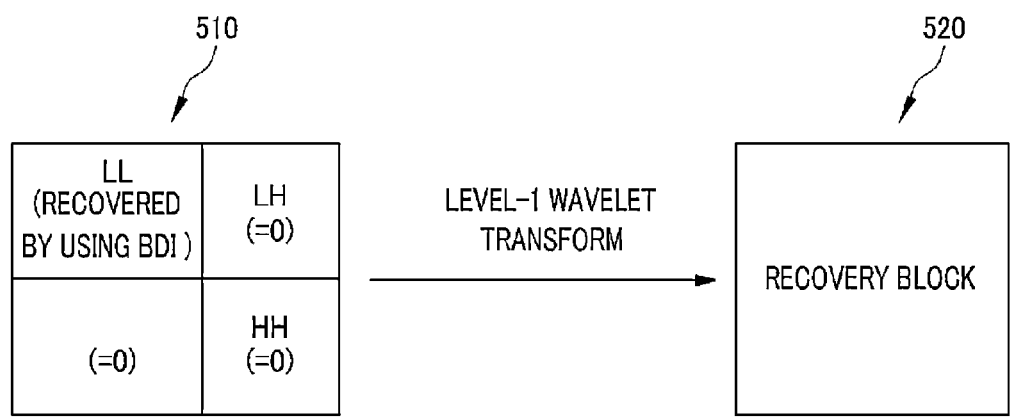
FIG. 7 illustrates an example for inverse level-1 wavelet transform in accordance with an exemplary embodiment of the present disclosure.

FIG. 7 illustrates an example for the level-1 inverse discrete wavelet transform in accordance with an exemplary embodiment of the present disclosure.

As described above, recovery data 510 can be generated by applying the block description information (BDI) into data in a frequency domain of the error block. In the generated recovery data 510, data of LL sub-band may be applied with the block description information (BDI) and data of LH sub-band, HL sub-band, and HH sub-band may be applied with a value of "0.".

Such generated recovery data 510 can be transformed into a recovered block 520 through the level-1 inverse wavelet transform.

The above-described embodiment explains that the inverse discrete transform is carried out at level-1. However, the embodiment is merely exemplary. The inverse discrete wavelet transform may be carried out with the same level as that of the discrete wavelet transform carried out in the video content providing server.

From S260, or if the test of S240 is "NO", in S270, the error recovery device 200 generates a video by combining at least one block segmented in S220. When at least one error block is recovered in S260, the error recovery device 200 can replace the error block with the recovered block to generate the video to be provided.

The error recovery device 200 transmits the generated video to a reception device, e.g., a set-top box (STB) through a wired or wireless network.

Figure 4:
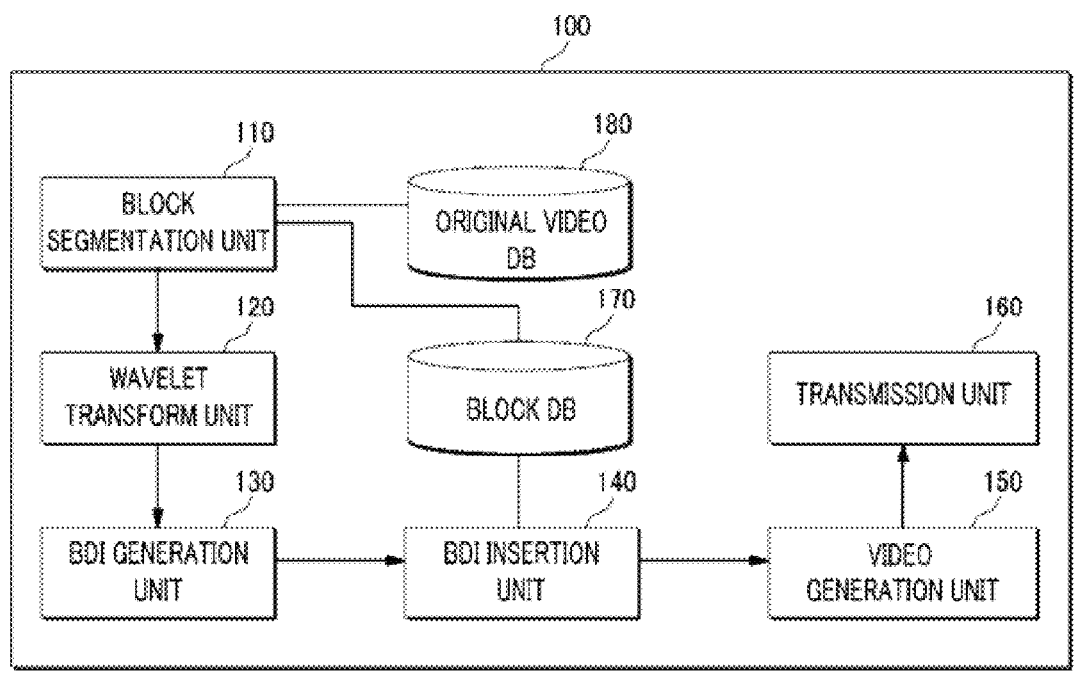
FIG. 4 is a block diagram illustrating a video content providing server in accordance with an exemplary embodiment of the present disclosure.

FIG. 4 is a block diagram illustrating a video content providing server in accordance with an exemplary embodiment of the present disclosure.

Referring to FIG. 4, the video content providing server 100 in accordance with an exemplary embodiment of the present disclosure includes a block segmentation unit 110, a wavelet transform unit 120, a block description information (BDI) generation unit 130, a block description information (BDI) insertion unit 140, a video generation unit 150, a transmission unit 160, a block database 170, and an original video database 180.

The block segmentation unit 110 receives an original image from the original video database 180 and segments the original image into at least one block in the same size. The size of the segmented blocks may be pre-set or changed depending on a size, resolution, etc. of the original image.

The wavelet transform unit 120 carries out discrete wavelet transform (DWT) on each of the at least one block. The wavelet transform unit 120 can transform data of each of the blocks into data including the LL, LH, HL, and HH sub-bands through the discrete wavelet transform (DWT).

By using the data included in the LL sub-band among the data transformed by the wavelet transform unit 120, the block description information (BDI) generation unit 130 generates block description information (BDI) of the corresponding block.

Since the block description information (BDI) generation unit 130 uses the LL sub-band including data describing characteristics of the corresponding block to generate the block description information (BDI), the block description information (BDI) generation unit 130 can generate block description information (BDI) including sufficient information for recovering the corresponding block while having a minimum size.

The block description information (BDI) insertion unit 140 inserts the generated block description information (BDI) into another block which is different from a block to be recovered by using the block description information (BDI).

Such block description information (BDI) is used to recover an error block. When an error has occurred in a certain block, block description information (BDI) may be obtained from the other block in order to recover the error block based on the obtained BDI.

A target block to be inserted with the BDI can be selected by pre-set reference information. The block description information (BDI) insertion unit 140 may select a block separated in a predefined distance from the block where the block description information (BDI) is extracted from and insert the block description information (BDI) into the selected block in order to recover error blocks not only from isolated block loss but also continuous block loss and burst block loss.

The block description information (BDI) insertion unit 140 can insert the block description information (BDI) into the least significant bit (LSB) plane of the selected block.

The video generation unit 150 generates video contents by combining at least one block which includes block description information (BDI) of the other blocks.

Unlike the original image stored in the original image database 180, the video contents generated by the video generation unit 150 include block description information (BDI) for recovering error.

The transmission unit 160 transmits the video contents generated by the video generation unit 150 to a reception device, e.g., a set-top box (not illustrated) through a wired or wireless network.

Figure 5:
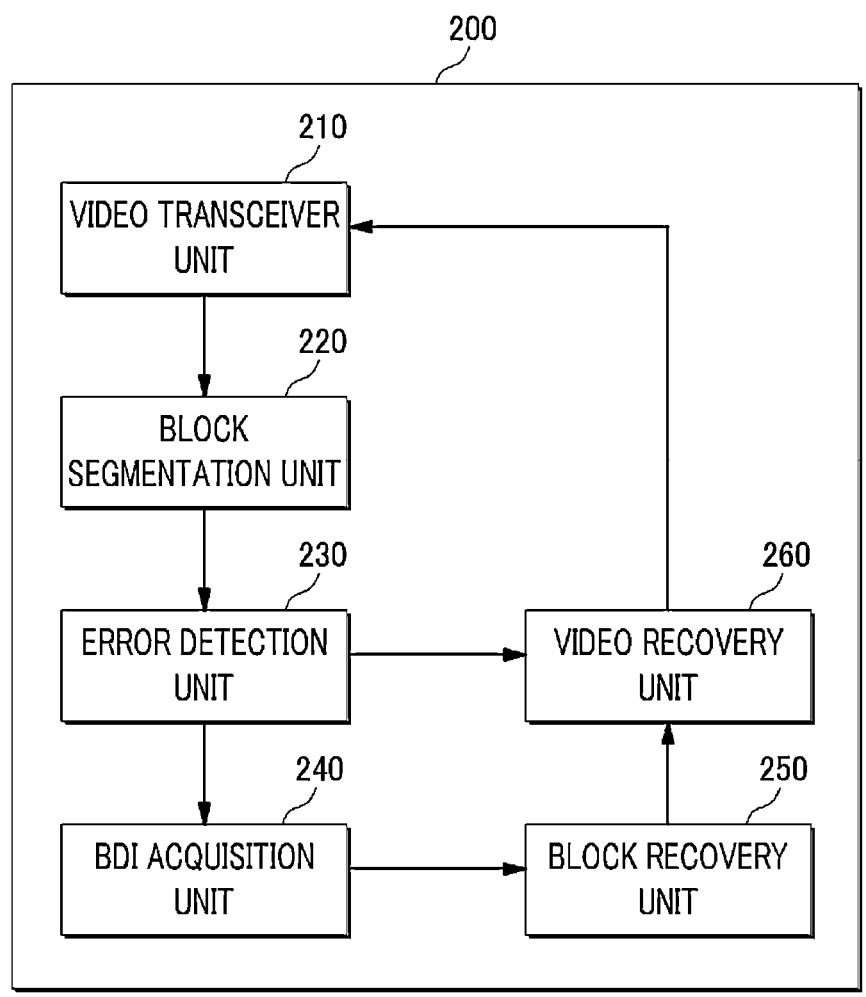
FIG. 5 is a block diagram illustrating an error recovery device in accordance with an exemplary embodiment of the present disclosure.

FIG. 5 is a block diagram illustrating an error recovery device in accordance with an exemplary embodiment of the present disclosure.

Referring to FIG. 5, the error recovery device 200 in accordance with an exemplary embodiment of the present disclosure includes a video transceiver unit 210, a block segmentation unit 220, an error detection unit 230, a block description information (BDI) acquisition unit 240, a block recovery unit 250, and a video recovery unit 260.

The video transceiver unit 210 receives video contents from the video content providing server (not illustrated) or another error recovery device (not illustrate) through a wired or wireless network. The received video contents may be i) video contents have not been recovered from an error after generated by the video content providing server, or ii) video contents have been recovered from errors at least one time through another error recovery device.

The video transceiver unit 210 transmits video contents recovered by the video recovery unit 270 to a reception device, e.g., a set-top box (not illustrated) through a wired or wireless network.

The block segmentation unit 220 segments the received video contents into at least one block.

The received video contents may include information for error recovery. The information for error recovery may include block segmentation information such as information on a size of a block segmented from an original image by the video content providing server in order to generate information for error recovery.

The block segmentation unit 220 may segment an image of the received video contents into at least one block depending on pre-set reference information. Alternatively, the block segmentation unit 220 may determine a block size using the block segmentation information included in the received video contents and segment an image of the received video contents into at least one block based on the determined block size.

The error detection unit 230 determines whether an error has occurred in each of the blocks. The error detection unit 230 can detect an error by calculating an average value for brightness of all pixels in the block and determining whether the calculated average value corresponds to a pre-set reference value. For example, if an average value for brightness of all pixels corresponds to 0, the error detection unit 230 can determine that an error has occurred in the corresponding block.

The block description information (BDI) acquisition unit 240 acquires block description information (BDI) of the detected error block.

Each of the blocks segmented from an image of the received video contents may include block description information (BDI) of the other block, excluding itself. In particular, each block may include block description information (BDI) in the least significant bit (LSB) plane.

The block description information (BDI) acquisition unit 240 searches for a block including block description information (BDI) of the detected error block and acquire block description information (BDI) of the error block from the least significant bit (LSB) plane of the searched block.

The block recovery unit 250 generates recovery data using the acquired block description information (BDI) and recovers the detected error block using the generated recovery data.

The block recovery unit 250 acquires values for the LL sub-band using the data included in the block description information (BDI) and generates recovery data in a frequency domain corresponding to the detected error block using the acquired values. In this case, among the generated data in the frequency domain, the value of 0 may be applied as the data of the LH sub-band, the HL sub-band, and the HH sub-band.

The block recovery unit 250 generates a recovered block by applying the level-1 inverse discrete wavelet transform on the generated recovery data in the frequency domain in order to replace the detected error block with the recovered block.

The video recovery unit 260 generates video contents once again by combining i) blocks in which no error has been detected, and ii) the block in which the error has been detected and recovered. The video recovery unit 260 recovers the video contents by using the block, in which the error has been recovered, and transmits the recovered video contents to a reception device, e.g., a set-top box (STB) (not illustrated) through the video transceiver unit 210.

In an exemplary embodiment of the present disclosure, at least one error recovery device 200 is positioned between the video content providing server 100 and a reception device, e.g., a set-top box (STB) 300. The at least one error recovery device 200 analyzes video contents transmitted from the video content providing server 100 to the set-top box (STB) 300, detect an error occurring in the process of transmitting the video contents, recover the detected error, and provide the recovered video contents to the set-top box (STB) 300.

In accordance with an exemplary embodiment of the present disclosure, the video contents providing server 100 may monitor each channel to determine whether transmission error is occurred in cooperation with a quality measurement server 10 and a quality collection server 20 in a video contents service network such as an internet protocol television (IPTV) network. Based on the monitoring result, the video contents providing server 100 may recover video contents from the generated error and provide the error-recovered video contents to a user. Accordingly, the video contents providing server 100 may prevent video contents from deterioration caused by a transmission error.

That is, the error recovery device 200 transmits information on error detection and error recovery performed for video contents to the quality management server 10. The quality management server 10 can manage the quality of the IPTV service by using the received error detection and recovery information and prevent deterioration of the quality of the video contents.

FIG. 8 illustrates an image recovered by a video error recovery system using a data hiding scheme in accordance with an exemplary embodiment of the present disclosure.

Video recovery performance may be measured by using a peak signal to noise ratio (PSNR) (dB) that might be used for measurement of objective visual quality. PSNR can be calculated by Formula 2 below.

$$PSNR = 10\log_{10} \frac{255^2}{\frac{1}{MN}\sum_{i=0}^{M-1}\sum_{j=0}^{N-1}\|O(i,j) - W(i,j)\|^2}. \quad \text{[Formula 2]}$$

In the Formula 2, M and N are width and length of an image, respectively, O(i, j) refers to an original image, and W(i, j) refers to a recovered image. By using the Formula 2, relative visual quality of a recovered image to an original image can be objectively measured in accordance with an exemplary embodiment of the present disclosure.

FIG. 8 illustrates an original image 610, an image 620, in which a block loss rate is 50%, an image 630 recovered by the spatial interpolation scheme, an image 640 recovered by the discrete cosine-based scheme, and an image 650 recovered by the discrete wavelet transform scheme in accordance with an exemplary embodiment of the present disclosure.

Upon analyzing PSNR values for the illustrated images, PSNR of the 50% block loss image (50%) is 8 dB, PSNR of the image recovered by the spatial interpolation scheme is 20.03 dB, PSNR of the image recovered by the discrete cosine scheme is 29.89 dB, and PSNR of the image recovered by the discrete wavelet transform scheme in accordance with an exemplary embodiment of the present disclosure is 31.05 dB.

If a video is recovered in accordance with an exemplary embodiment of the present disclosure, PSNR is improved by about 11 dB, compared to the case where a video is recovered by the spatial interpolation scheme. Consequently, a video recovered in accordance with an exemplary embodiment of the present disclosure has objectively the highest quality.

In case of subjectively measuring the video quality by the naked eye, blurring and discontinuity between blocks are present in the video recovered by the spatial interpolation scheme. Also, visible discontinuity between blocks is present in an edge area and a texture area (e.g., book and table cloth parts) of the video recovered by the discrete cosine scheme. However, in the video recovered in accordance with an exemplary embodiment of the present disclosure, blurring and discontinuity between blocks are not found.

An image recovered in accordance with an exemplary embodiment of the present disclosure has improved visual quality, as compared to an image recovered by a conventional technology.

Figure 9:
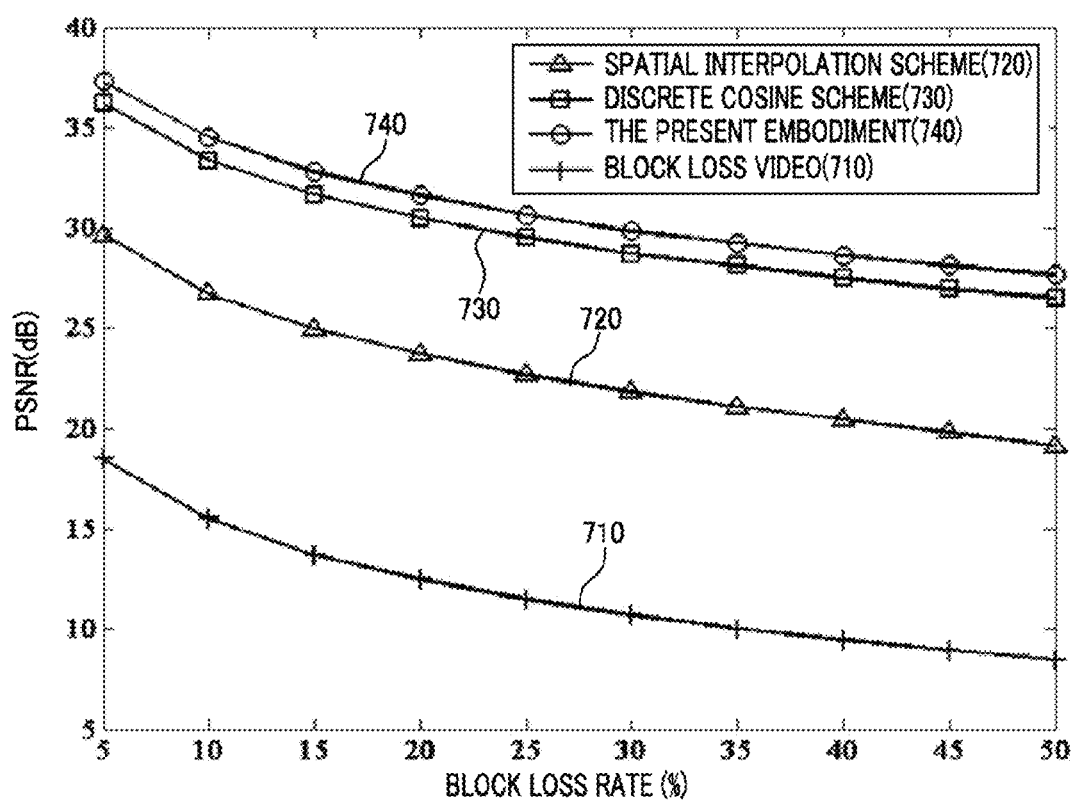
FIG. 9 illustrates peak signal to noise ratio (PSNR) (dB) of an image recovered by a video error recovery system using hidden data in accordance with an exemplary embodiment of the present disclosure when compared to an image recovered by a conventional technology.

FIG. 9 illustrates PSNR (dB) of an image recovered by a video error recovery system using a data hiding scheme in accordance with an exemplary embodiment of the present disclosure and an image recovered by a conventional technology.

In order to measure performance of video recovery in a conventional technology and an exemplary embodiment of the present disclosure, a total of 100 gray-scale (8-bit/pixel) images having 256 pixels in width and 256 pixels in length were used. For the images having various block loss rates, the spatial interpolation scheme and the discrete cosine scheme, which are conventional methods, and the error recovery method in accordance with an exemplary embodiment of the present disclosure are applied and compared.

A block transmission loss rate in a wired or wireless network environment was set to 5% to 50% of the whole number of the blocks. Accordingly, when the block segmentation unit segments the image having 256 pixels in width and 256 pixels in length into blocks having 8 pixels in width and 8 pixels in length, 51 to 512 blocks may be lost among 1,024 blocks.

The graph of FIG. 9, when block loss rate is 5 to 50%: i) an average PSNR value 710 for one hundred (100) images, in which blocks are lost, ii) an average PSNR value 720 for one hundred (100) images recovered by the spatial interpolation scheme, iii) an average PSNR value 730 for one hundred (100) images recovered by the discrete cosine scheme, and iv) an average PSNR value 740 for one hundred (100) images recovered by the discrete wavelet transform method in accordance with an exemplary embodiment of the present disclosure.

As illustrated in the graph of FIG. 9, the average PSNR value of the video recovered in accordance with an exemplary embodiment of the present disclosure was the highest for every block loss rate. Accordingly, the loss recovery method using the discrete wavelet scheme in accordance with an exemplary embodiment of the present disclosure has the highest performance.

Also, it can be understood that the error recovery method in accordance with the present disclosure can be applied to many videos having various characteristics as well as to one video.

The exemplary embodiments of the present disclosure can be embodied in a fixed, tangible storage medium including instruction codes or a program module executable by a computer or processor. A data structure in accordance with the illustrative embodiments can be stored in the storage medium executable by the computer or processor. A computer readable medium can be any usable medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes information transmission mediums.

The method and the system of the present disclosure have been described in relation to the certain embodiments. However, the components or parts or all the operations of the method and the system may be embodied using a computer system having universally used hardware architecture.

The above description of the present disclosure is provided for the purpose of illustration, and it would be understood by those skilled in the art that various changes and modifications may be made without changing technical conception and essential features of the illustrative embodiments. Thus, it is clear that the above-described illustrative embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the illustrative embodiments. It shall be understood that all modifications and embodiments conceived from the meaning and scope of the claims and their equivalents are included in the scope of the inventive concept.

The invention claimed is:

1. A method for recovering video contents by using information for video error recovery, the method comprising:
    (a) segmenting first video contents into a plurality of blocks;
    (b) detecting an error block from the segmented blocks;
    (c) acquiring corresponding block description information (BDI) about the error block in which the error has been detected, from a pre-set bit plane of a pre-set block different from the error block, if the error block is detected among the segmented blocks, wherein the BDI is information that describes characteristics of an original image of a corresponding block and is generated by applying a low pass filter to the original image;
    (d) generating recovery data including data of at least one sub-band by using the acquired block description information (BDI), and generating a recovery block by applying an inverse discrete wavelet transform (IDWTR) to the recovery data; and
    (e) generating second video contents by using a normal block in which no error has been detected among the segmented blocks, and the generated recovery block,
    wherein prior to the segmenting, the method comprising:
        generating the block description information (BDI) for each of the blocks of the first video contents by binarizing data wherein the data describes characteristics of the first video contents and the data is included in the at least one sub-band of one block; and
        inserting the generated block description information (BDI) into the pre-set bit plane of the pre-set block different from the one block, and
    wherein the step (d) comprises:
        (d1) generating the recovery data by using data included in the acquired block description information (BDI) corresponding to a LL sub-band including data of a low frequency with respect to horizontal and vertical directions, and applying a pre-set value to a sub-band except for the LL sub-band; and
        (d2) generating the recovery block by applying an inverse discrete wavelet transform (IDWT) to the generated recovery data.

2. The method of claim 1,
    wherein the pre-set block is a pre-set distance away from a position of the error block.

3. The method of claim 1,
    wherein the pre-set bit plane is the least significant bit (LSB) plane.

4. A video content providing system for recovery from a video error by using video recovery information inserted into video contents, the system comprising:
    a video content providing server configured to generate at least one block description information (BDI) for error recovery by applying a discrete wavelet transform (DWT) to at least one block segmented from an original image, and to generate video contents including the at least one block description information (BDI), wherein BDI is information that describes characteristics of an original image of a corresponding block and is generated by applying a low pass filter to the original image of the corresponding block;
    at least one error recovery server configured to detect an error occurring in the video contents during transmission of the provision video contents, and to recover the detected error by applying an inverse discrete wavelet transform (IDWT) to the block description information included in the video contents; and
    a user device configured to receive the video contents, in which the error has been recovered by the error recovery server and to output the provisional video contents to a display device,
    wherein the video content providing server is configured to i) generate block description information (BDI) associated with one block by binarizing data included in at least one sub-band of the one block and ii) insert the generated block description information (BDI) into a pre-set block different from the one block, and wherein the at least one error recovery server is configured to:

generate recovery data by using data included in block description information (BDI) corresponding to a LL sub-band including data of a low frequency with respect to horizontal and vertical directions, and applying a pre-set value to a sub-band except for the LL sub-band; and generate the recovery block by applying an inverse discrete wavelet transform (IDWT) to the generated recovery data.

5. The video content providing system of claim 4, further comprising:

a quality management server configured to manage quality information of a network between the video content providing server and the user device by using error detection information received from the error recovery server.

6. The video content providing system of claim 5, wherein the quality management server is configured to manage quality of a video content providing service to the user device by using the error detection information and the error recovery information received from the error recovery server.

* * * * *